United States Patent
Chir et al.

(10) Patent No.: US 10,634,264 B2
(45) Date of Patent: Apr. 28, 2020

(54) INDICATOR OF THE OPENING AND/OR CLOSING STATUS OF A TAP OR A PRESSURE REDUCER

(71) Applicant: LUXEMBOURG PATENT COMPANY S.A., Lintgen (LU)

(72) Inventors: Pascal Chir, Montigny-lès-Metz (FR); Paul Muzzo, Yutz (FR); Jean-Claude Schmitz, Heisdorf (LU)

(73) Assignee: Luxembourg Patent Company S.A., Lintgen (LU)

( * ) Notice: Subject to any disclaimer, the term of this patent is extended or adjusted under 35 U.S.C. 154(b) by 98 days.

(21) Appl. No.: 15/765,662

(22) PCT Filed: Oct. 5, 2016

(86) PCT No.: PCT/EP2016/073808
§ 371 (c)(1),
(2) Date: Apr. 3, 2018

(87) PCT Pub. No.: WO2017/060310
PCT Pub. Date: Apr. 13, 2017

(65) Prior Publication Data
US 2018/0306345 A1 Oct. 25, 2018

(30) Foreign Application Priority Data

Oct. 8, 2015 (LU) .......................... 92844

(51) Int. Cl.
*F16K 37/00* (2006.01)
*F16K 1/30* (2006.01)

(52) U.S. Cl.
CPC .......... *F16K 37/0008* (2013.01); *F16K 1/302* (2013.01); *Y10T 137/8225* (2015.04); *Y10T 137/8275* (2015.04)

(58) Field of Classification Search
CPC ......... Y10T 137/8275; Y10T 137/8225; F16K 37/0008; F16K 1/302
See application file for complete search history.

(56) References Cited

U.S. PATENT DOCUMENTS

| | | | | |
|---|---|---|---|---|
| 2,407,944 A | * | 9/1946 | Bassett | F16K 37/0008 116/277 |
| 3,298,659 A | * | 1/1967 | Cupedo | F15B 15/068 251/14 |

(Continued)

FOREIGN PATENT DOCUMENTS

| DE | 10245766 A1 | 1/2004 |
|---|---|---|
| DE | 102005015342 A1 | 10/2006 |
| EP | 0584975 A1 | 3/1994 |

OTHER PUBLICATIONS

International Search Report dated Dec. 15, 2016 for Parent PCT Appl. No. PCT/EP2016/073808.

*Primary Examiner* — Jessica Cahill
*Assistant Examiner* — Patrick C Williams
(74) *Attorney, Agent, or Firm* — James E. Walton

(57) ABSTRACT

The invention is directed to an indicator (22) of the opening and/or closing status of a device controlling the flow of a fluid, such as a tap or a pressure reducer for compressed gas, comprising a sleeve-shaped support (24) to rotatably engage with a protruding portion (18) of a body of the device and from which an actuating spindle (20) extends along a longitudinal axis of said device; an indicator sleeve (26) axially sliding along the support (24); a rotor (28) to be fixed to the spindle (20) and comprising at its periphery a least one track (32) with a curved profile; and at least one track follower (30) extending radially from the indicator sleeve (26) through a longitudinal slot (242) in the support (24) and engaging with the at least one track (32).

19 Claims, 5 Drawing Sheets

(56) References Cited

U.S. PATENT DOCUMENTS

| | | | | |
|---|---|---|---|---|
| 3,396,938 A | * | 8/1968 | Matsui | F16K 31/04 |
| | | | | 251/229 |
| 3,606,807 A | * | 9/1971 | Williams | B23B 13/08 |
| | | | | 82/162 |
| 4,235,258 A | * | 11/1980 | Uno | F16K 37/0008 |
| | | | | 137/556 |
| 5,535,698 A | | 7/1996 | Trevisan | |
| 5,609,185 A | * | 3/1997 | Booth | F16K 7/126 |
| | | | | 137/556 |
| 2005/0139268 A1 | | 6/2005 | Kremer et al. | |
| 2013/0180608 A1 | * | 7/2013 | Chang | F16K 37/0008 |
| | | | | 137/553 |

* cited by examiner

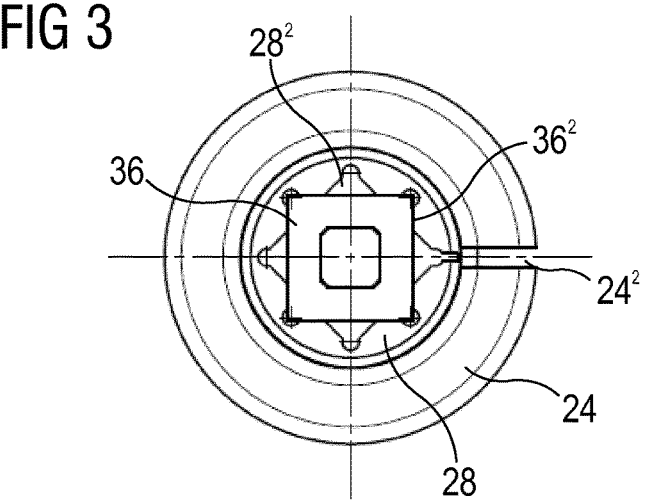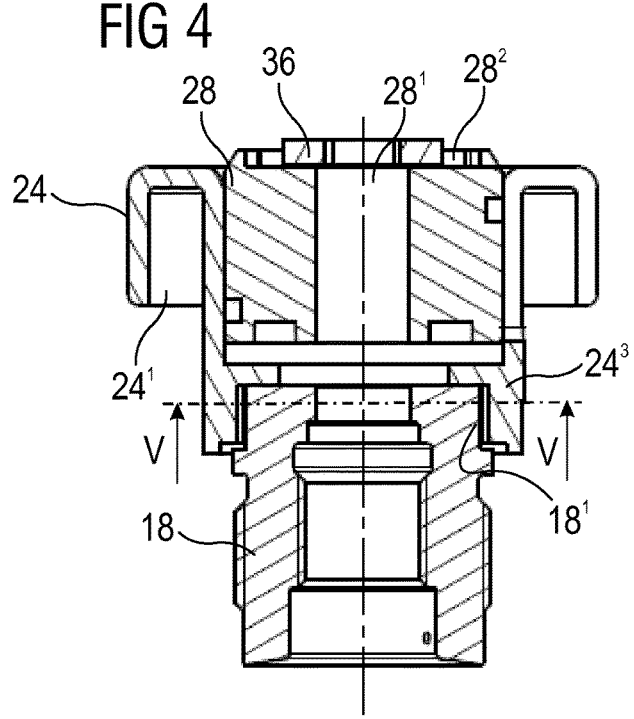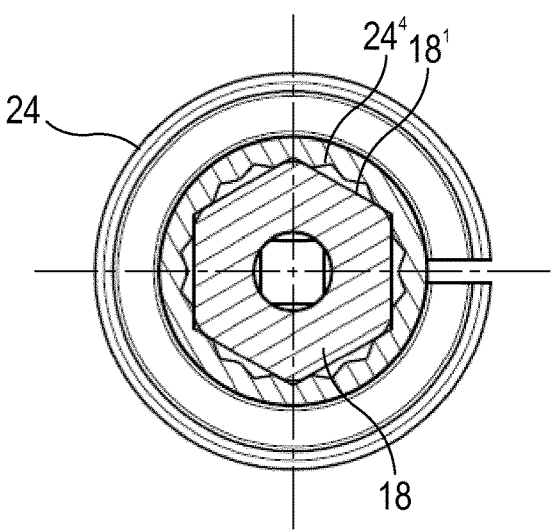

INDICATOR OF THE OPENING AND/OR CLOSING STATUS OF A TAP OR A PRESSURE REDUCER

TECHNICAL FIELD

The invention is directed to the field of devices for controlling the flow of a fluid, like a compressed gas. These devices can be taps or pressure reducers. More particularly, the invention is directed to the indication of the status of such devices.

BACKGROUND ART

Prior art patent document published US 2005/0139268 A1 discloses a tap for gas cylinder and with a position indicator. The latter is mounted between a cylindrical portion of the tap body and the actuating wheel of the tap. The position indicator comprises, essentially, a sleeved-shaped support slip on the cylindrical portion of the tap body and an indicator sleeve with an inner thread engaging with an outer thread on the support. The indicator sleeve is also in rotational engagement with the actuating wheel of the tap. The sleeve-shaped support comprises a signalling end portion that can be covered and uncovered by the indicator sleeve. During operation of the tap, when rotating the actuating wheel, the indicator sleeve is rotated and, by virtue of the thread engagement with the support, can move up and down to uncover and cover, respectively, the signalling end portion of the support. This indicator is interesting by its simplicity. It shows however as drawback that the position of the indicator sleeve is linear with the rotation angle of the actuating wheel. In other words, a tap that is opened by a limited rotation angle, for example of an angle comprised between 50° and 90°, will not show a clear indication that the tap is opened whereas for many applications the gas will flow almost as if the tap was fully opened.

Prior art patent document published DE 10 2005 015 342 A1 discloses a visual indicator of the sense of rotation of the last manipulation of the spindle of a valve. The indicator comprises a rotation ring that is in rotational engagement with the spindle, a movement transmission ring with sloped slots and an indicator ring. The rotation ring comprises pins that engage with the sloped slots of the movement transmission ring and with the indicator ring so that upon rotation of the spindle, the indicator ring moves up or down thanks to the pins sliding along the sloped slots. The rotation ring is only frictionally engaged with the spindle, meaning the spindle can rotate relative to said ring when the pins are at the end of the slots. Also the slots are generally straight presumably because they are intended to provide a rapid movement of the indicator ring in response to the rotation of the spindle, bearing in mind that the spindle can be further rotated when the indicator reaches one of its two end positions.

None of these two teachings provides a position indicator that permits a rapid change in the position or status indication and that provides a reliable indication of the opening and/or closing status after several actuations of the valve or tap.

SUMMARY OF INVENTION

Technical Problem

The invention has for technical problem to overcome at least one of the drawbacks of the prior art, in particular of the above mentioned prior art. More particularly, the invention has for technical problem to provide a status indicator for a device controlling the flow of a fluid, such as a tap or a pressure reducer for compressed gas, which provides a rapid change in the indication when actuating said device and that remains reliable after several actuations.

Technical Solution

The invention is directed to an indicator of the opening and/or closing status of a device controlling the flow of a fluid, such as a tap or a pressure reducer for compressed gas, comprising: a sleeve-shaped support to rotatably engage with a protruding portion of a body of the device and from which an actuating spindle extends along a longitudinal axis of said device; an indicator sleeve axially sliding along the support; means for converting a rotation of the spindle into a translation of the indicator sleeve; wherein the converting means comprises a rotor to be fixed to the spindle and comprising at its periphery a least one track with a curved profile; and at least one track follower extending radially from the indicator sleeve through a longitudinal slot in the support and engaging with the at least one track.

According to a preferred embodiment, the curved profile of the track comprises, successively along said track, a generally straight first portion, an S-shaped second portion and a generally straight third portion.

According to a preferred embodiment, the second portion extends over an angular sector comprised between 50° and 70°, preferably between 55° and 65°.

According to a preferred embodiment, the first portion extends over an angular sector comprised between 20° and 60°, preferably between 30° and 50°, and the third portion extends over an angular sector of more than 200°, or vice versa.

According to a preferred embodiment, the profile of at least one of the first and third portions extends essentially in a plane that is perpendicular to the longitudinal axis.

According to a preferred embodiment, the first and third portions are distant along the longitudinal axis by at least 5 mm, preferably at least 10 mm, more preferably at least 15 mm.

According to a preferred embodiment, the at least one track is a slot and the at least one track follower is a pin, said pin being preferably rigidly attached to the indicator sleeve.

According to a preferred embodiment, the rotor comprises along the longitudinal axis a cavity with a section that is not circular so as to rotatably engage with a corresponding section of the spindle, said sections being preferably square-shaped.

According to a preferred embodiment, the non-circular section of the rotor is formed by a washer rotatably engaging with a cavity of the rotor such that the washer can be positioned at different angular positions.

According to a preferred embodiment, the washer has an outer contour with edges along said contour and the cavity of the rotor has corresponding recesses in a number that is greater than the number of edges so as to allow the different angular positions.

According to a preferred embodiment, the support comprises an inner surface with fluting for rotatably engaging with contour edges of the protruding portion of the body of the device at different angular positions.

According to a preferred embodiment, the fluting is formed at one end of the support, said end being preferably longitudinally slotted so as to form legs able to flex and pass over the edges of the contour of the protruding portion when a torque over a predetermined level is applied to the rotor.

According to a preferred embodiment, the support comprises an annular recess in which the indicator sleeve can be hidden in a position of the rotor.

According to a preferred embodiment, the indicator sleeve comprises an outer circular surface with coloured and/or indicia marking.

The invention is also directed to a device controlling the flow of a fluid, such as a tap or a pressure reducer for compressed gas, comprising: a body with a fluid inlet, a fluid outlet and a passage fluidly connecting said inlet with said outlet; a closure member cooperating with a seat in the passage for controlling the flow of fluid; a spindle rotatably mounted on a protruding portion of the body and configure for influencing the position the closure member; an actuating wheel mounted on the spindle; and an indicator of the opening and/or closing status of the device; wherein the indicator is according to the invention.

According to a preferred embodiment, the protruding portion of the body comprises an edged contour that mates with the support of the indicator, said edged contour being preferably formed by a gland nut around the spindle.

According to a preferred embodiment, the spindle and the wheel can rotate from a closed position of the device to a fully opened position of said device over an angular stroke, the indicator is in accordance with any one of claims 2 to 6, and the S-shaped portion of the curved profile of the track is located on an a third of the angular stroke starting from the closed position or the fully opened position.

Advantages of the Invention

The invention is particularly interesting in that it provides a useful and reliable indication of the status of a device such as a tap, a valve or a pressure reducer. The indication can been easily seen by an operator located at any position around the longitudinal axis of the device. Also, the use of the rotor and of a track on said rotor provides a large freedom for controlling the position of the indicator sleeve relative to the angular position of the spindle. Also the indicator can be easily mounted on existing designs of devices, the only adaption possibly required being for the spindle which might need to be longer. Also the indicator can be precisely angularly adjusted while being mounted on the device. This precise adjustment is provided by the combination of the several angular positions for the support on the device body and of the several angular positions of the rotor relative to the spindle, thanks to the washer connecting the spindle with the rotor.

BRIEF DESCRIPTION OF THE DRAWINGS

FIG. 3 is a top view of the indicator of FIGS. 1 and 2, without the actuating wheel.

FIG. 4 is a cross-sectional view of the indicator of FIGS. 1 and 2, without the spindle and the actuating wheel.

FIG. 5 is a cross-sectional view V-V of the indicator as illustrated in FIG. 4.

DESCRIPTION OF AN EMBODIMENT

Figure 1:
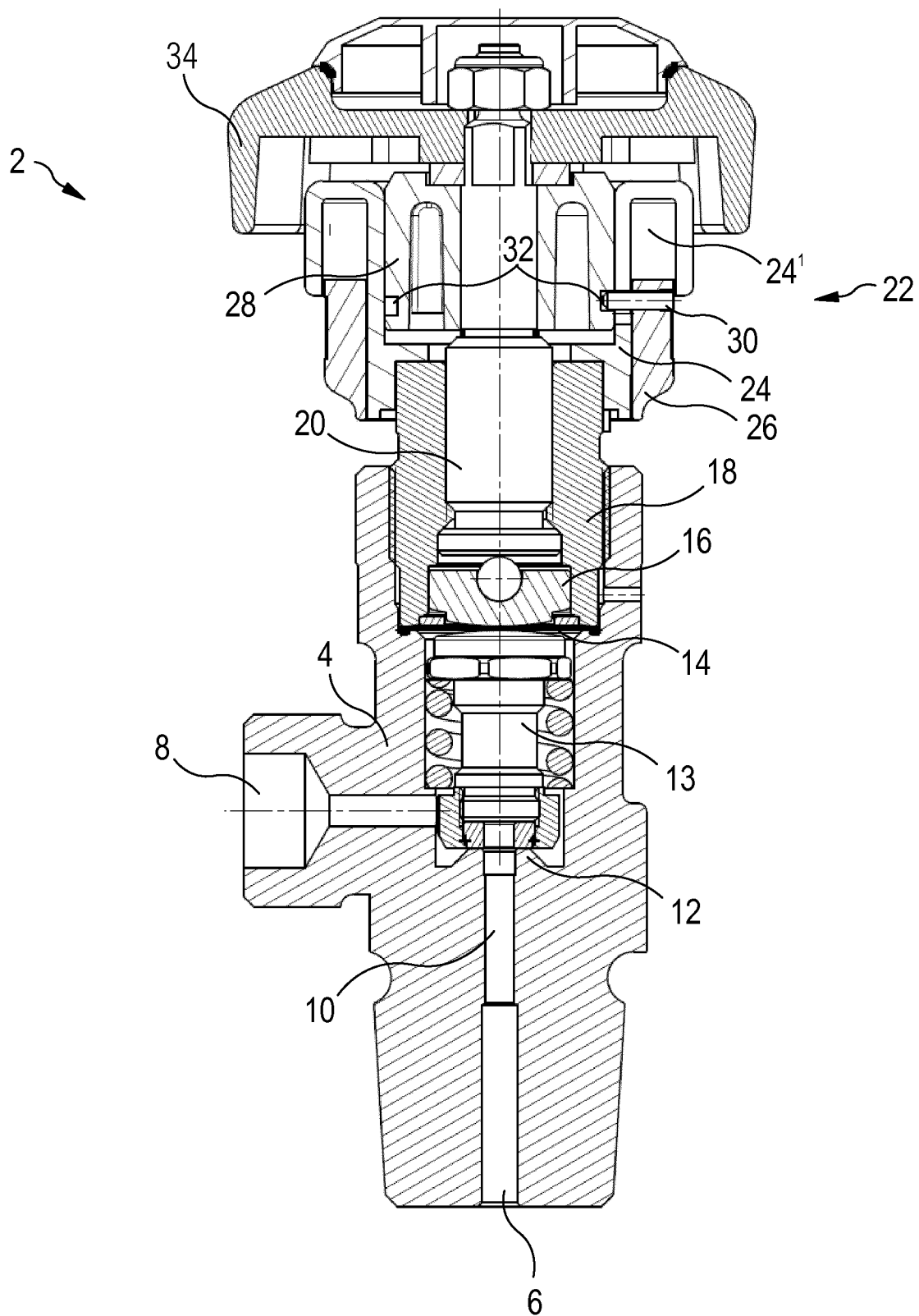
FIG. 1 is a cross-sectional view of a tap for a gas cylinder and equipped with an indicator of the opening and/or closing status in accordance with the invention.

FIG. 1 is a cross-sectional view of a shut-off valve or tap for gas cylinders, equipped with an indicator of the opening and/or closing status in accordance with the invention.

The tap 2 comprises a body 4 with an inlet 6, an outlet and a passage 10 fluidly connecting the inlet 6 with the outlet 8. In the passage 10 there is provided a seat 12, around said passage, and a closure member 13 for cooperating the seat 12 in a gas tight fashion. To that end, the tap 2 comprises a pressure element 16 that is configured for exerting a pressure on the movable closure member 13, via a membrane 14, towards the seat 12. When such a pressure is exerted, the membrane 14 deforms and the closure member 13 moves to contact the seat 12 and shuts-off the passage through said seat 12, thereby shutting-off the passage and the fluid flow.

The tap 2 comprises a gland ring 18 that presses an outer annular area of the membrane 14 against a supporting surface in the body 4 in order to provide a gas tight delimitation of the passage 10 along the membrane 14.

The pressure element 16 is urged by a spindle 20 through a contact ball. The spindle 20 is in threaded engagement with the gland ring 18. Upon rotation of the spindle 20, the latter moves up or down along its longitudinal axis and opens or closes, respectively, the passage 10.

The tap 2 comprises an indicator 22 of the opening or closing status of the tap. The indicator 22 comprises a sleeve-shaped support 24 that is fixedly mounted on the tap 2. It comprises also an indicator sleeve or ring 26 that is able to slide along the longitudinal axis so as to hide in a cavity $24^1$ of the support or to unhide from said cavity. The indicator 22 comprises also a rotor 28 that is housed in the support 24 and that is rigidly attached to the spindle 20. At least one pin 30 extends radially from the indicator sleeve 26 through a longitudinal slot in the support 24 so as to engage in a slot 32 formed in the outer surface of the rotor 28. The slot 32 in the rotor 28 has a profile that varies longitudinally.

Upon rotation of the spindle 20 by operating the actuating wheel 34 rigidly attached to the spindle 20, the rotor 28 rotates and moves the pin 30 upwardly or downwardly, depending on the inclination of the slot and the sense of rotation of the spindle and the rotor, and moves thereby also upwardly or downwardly the indicator sleeve 26.

The indicator the opening and/or closing status will be explained more in details in connection with FIGS. 2 to 9.

Figure 2:
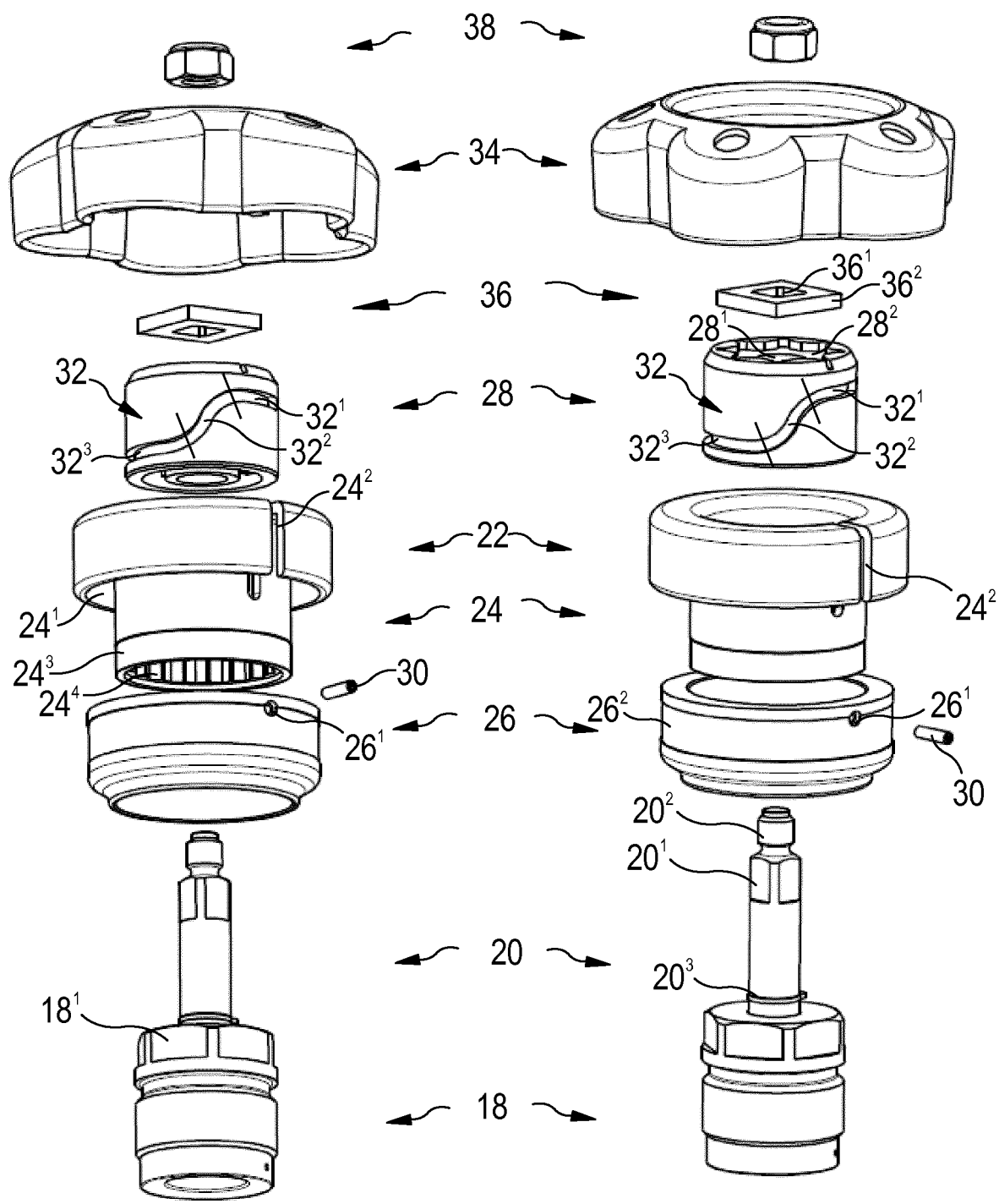
FIG. 2 comprises two exploded views, according to two different view angles, of the indicator of the tap of FIG. 1.

FIG. 2 illustrates in an exploded way according to two different view angles the indicator of the tap of FIG. 1.

As is apparent in FIG. 2, the sleeve-shaped support 24 comprises a longitudinal slot $24^2$ through which the pin 30 extends. The pin 30 is inserted with a press interference fit into a corresponding hole or bore $26^1$ in the indicator sleeve 26. The inner end of the pin 30 engages in the slot 32 of the rotor 28 so as to be able to slide along the track that is formed by said slot. The slot 32 extends in a circular manner along the outer surface of the rotor 28 and with a curved or at least non straight profile.

As is apparent in both view of FIG. 2, the slot 32 in the rotor 28 comprises a first portion $32^1$ that is generally straight, more precisely that extends in a plane that is perpendicular to the longitudinal axis. It comprises a second portion $32^2$ that is S-shaped, and a third portion $32^3$ that is generally straight or that is essentially contained in a plane that is perpendicular to the longitudinal axis, said plane being distant from the plane of the first portion $32^1$. The second portion $32^2$ is configured to provide a continuous and progressive connection between the first and third portions $32^1$ and $32^3$ which are distant from each other longitudinally.

The rotor 28 comprises a central through-hole $28^1$ that receives the spindle 20. It comprises also a cavity $28^2$ at its upper end, said cavity being generally star-shaped so as to form a series of angular recesses, for instance 8 such recesses. A washer 36, for instance with a square-shaped inner section $36^1$ and an outer square-shaped contour $36^2$, is inserted into the cavity $28^2$ with the contour $36^2$ mating and engaging with the recesses of said cavity. The square-shaped section $20^1$ of the spindle 20 rotatably engages with the square-shaped inner section $36^1$ of the washer 36.

The actuating wheel 34 comprises also a square-shaped inner section (see FIG. 1) that engages with the square-shaped section $20^1$ of the spindle 20. A nut 38 is screwed on the threaded end portion $20^2$ of the spindle 20 for securing the actuating wheel 34, the washer 36 and the rotor 28 in a stable position along the spindle 20. The latter can comprise a ring $20^3$ against which the rotor 28 can rest.

The sleeve-shaped support 24 is configured to be slip on the spindle 18 and the protruding portion, for instance a gland ring 18, of the body of the valve. To that end, the support 24 comprises an end portion $24^3$ with on its inner surface corrugations or fluting $24^4$ that rotatably engages with the edged contour $18^1$ of the gland ring 18.

When the spindle 20 and the rotor 28 rotate, the slot 32 slides along the pin 30 which remains stationary in a circumferential direction. Due to the fact that the slot evolves longitudinally, so does the pin 30 along the longitudinal slot $24^2$, thereby moving up or down the indicator sleeve 26.

FIG. 3 is a top view of the indicator of FIGS. 1 and 2, without the actuating wheel and without the spindle. We can observe the washer 36 with it edged outer contour $36^2$ engaging with recesses of the contour of the cavity $28^2$ on the top face of the rotor 28. We can observe that the inner contour of the cavity comprises 8 recesses providing intermediate positions for the washer.

FIG. 4 is a cross-sectional view of the indicator of FIGS. 1 and 2, without the spindle and the actuating wheel. FIG. 5 is a cross-sectional view V-V of the indicator of FIG. 4. These figures illustrate the engagement between the fluting or corrugations $24^4$ on the inner side of the end portion $24^3$ of the support 24 and the edged contour $18^1$ of the gland ring 18.

The combination of the multiple angular positioning of the spindle relative to the rotor 28 as illustrated in FIG. 3 with the multiple angular positioning of the support 24 relative to the gland ring 18, i.e. the tap body, provides a large number of angular positions, i.e. with small increments, between the rotor and the support when the rotor is in an angular end position of the indicator. This permits thereby a convenient mounting and adjustment of the indicator on the tap or any other device that controls the flow of a fluid, being understood that the relative angular position between the spindle and the body in an end position can vary from one device to the other of the same design, essentially due to an inherent tolerance dispersion.

Figure 6:
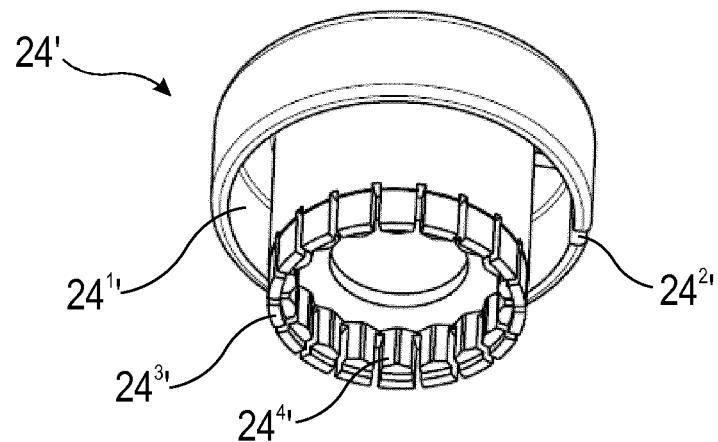
FIG. 6 is a view of an alternative of the sleeve-shaped support of the indicator of FIGS. 1 to 5.

FIG. 6 is a view of an alternative version of the sleeve-shaped support of the indicator of FIGS. 1 to 5. The alternative sleeve-shaped support 24' comprises at its lower end longitudinal slots that form flexible legs $24^{3'}$ supporting the corrugations or fluting $24^{4'}$. This support 24' is advantageous in that it allows it to be rotated over the edged contour of the gland ring when exerting a torque above a certain level. This can be particularly advantageous when assembling the tap or device and also when forcing the tap resulting in permanently deforming the closing surface so that the closed position has angularly moved. In such a case, the support will automatically move with the actuating wheel and the spindle when reaching the new closing position with the flexible legs snapping over the edges of the contour of the gland ring 18.

Figure 7:
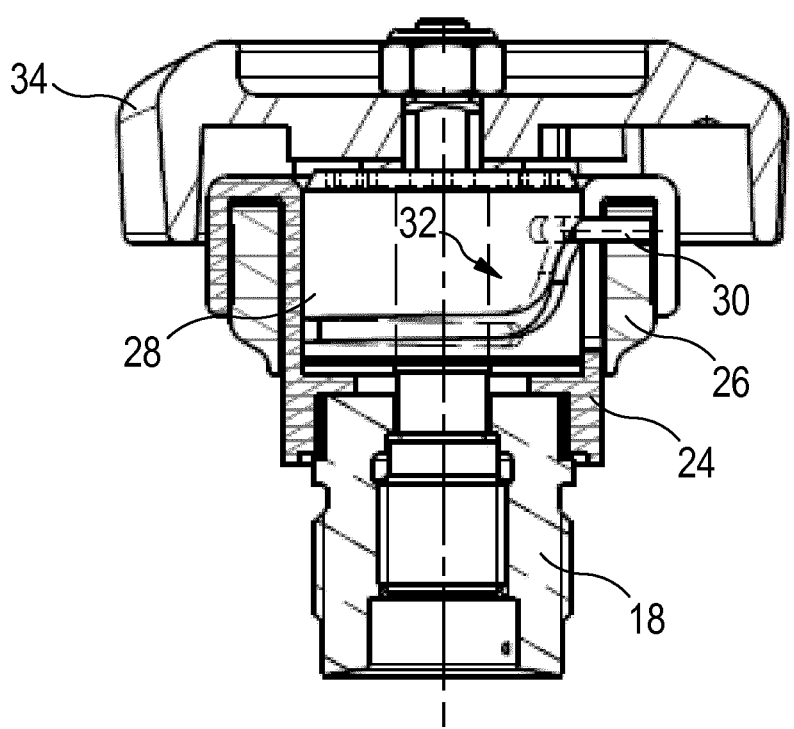
FIG. 7 is a cross-sectional view of the indicator of FIGS. 1 to 3 in a position that corresponds to a closed position of the tap.

FIG. 7 is a cross-sectional view of the indicator of FIGS. 1 to 3 in a position that corresponds to a closed position of the tap. In that position, the pin 30 is located in the first portion $32^1$ (see FIG. 2) of the slot 32 of the rotor 28. In that position, the pin 30 is in an upper position and the indicator ring 26 is also in an upper position, for instance at least partially hidden in the cavity $24^1$ (FIGS. 1, 2 and 5). Advantageously, the pin 30 in that position is distant from the end of slot in the first portion $32^1$, permitting the tap to be closed with more angle, e.g. further to a matting of the surfaces that shut-off the passage for the fluid.

Figure 8:
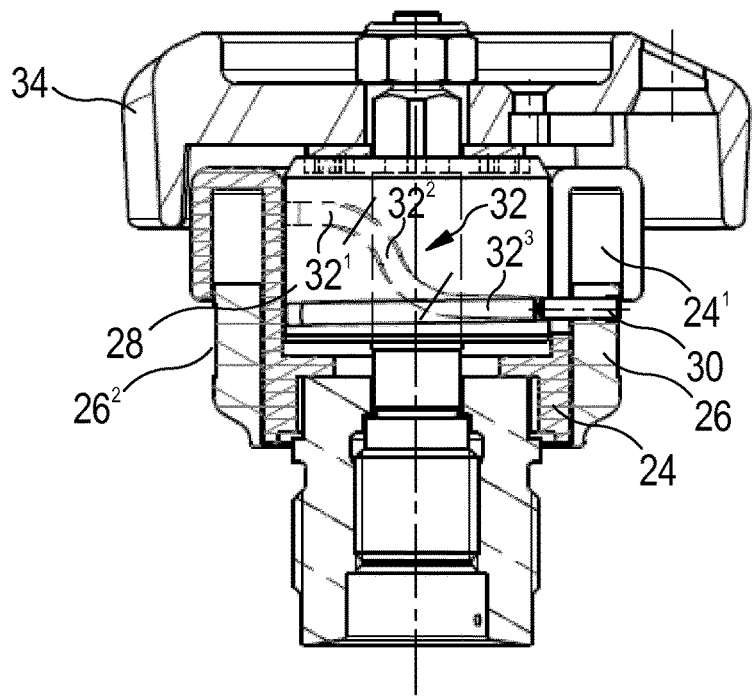
FIG. 8 corresponds to FIG. 7 where the device is in a partially opened position.

FIG. 8 corresponds to FIG. 7 where the device is in a partially opened position. We can observe that the pin 30 is located in the third portion $32^3$ of the slot 32, meaning that while the actuating wheel 34 is rotated (counter clockwise), the rotor 28 and the slot 32 rotate so that the pin 30 is guided successively along the first portion $32^1$, the S-shaped second portion $32^2$ and finally the third portion $32^3$. The pin 30 is therefore guided downwardly by the S-shaped second portion $32^2$ and thereby moves down the indicator sleeve 26. In FIG. 8, it is apparent that the indicator sleeve 26 has left the cavity $24^1$ of the support 24 and is now totally visible from any location around the tap. The outer surface $26^2$ of the indicator ring can be provided with coloured and/or indicia marking indicating that the tap is opened, that marking being otherwise hidden, i.e. not visible for an observer located somewhere around the tap, in the cavity $24^1$ of the support 24.

Still with reference with FIG. 8, it is apparent that the third portion $32^3$ of the slot 32 extends over a larger angular sector than the first one and also the second one. Indeed, the second portion rapidly guides the pin in order to provide a rapid move of the indicator sleeve reaching its end position indicating that the tap is open whereas the actuating wheel can still be rotated further to a fully opened position.

Figure 9:
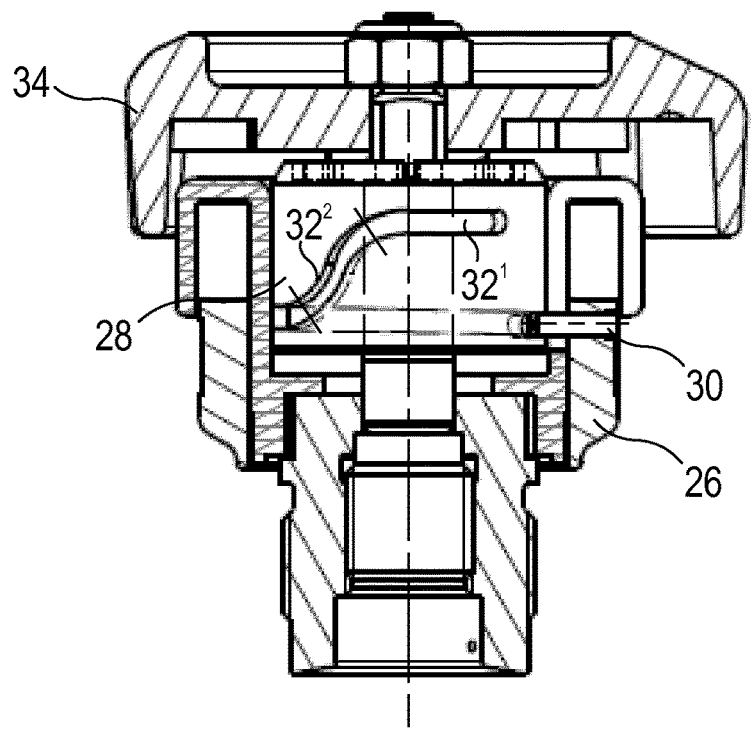
FIG. 9 corresponds to FIGS. 7 and 8 where the device is in a fully opened position.

FIG. 9 corresponds to FIGS. 7 and 8 where the device is in a fully opened position. In FIG. 9, the actuating wheel 34 has reached an end angular position corresponding to a maximum opening of the tap. The pin 30 is close to the end of the third portion $32^3$ of the slot 32. The first and second portions $32^1$ and $32^2$ that were on the back side of the rotor 28 in FIG. 8 have moved to the front visible side of the rotor in FIG. 9. Since the third portion $32^3$ of the slot 32 shows a constant height (with regard to the longitudinal axis), the indicator sleeve 26 has not moved between the position of FIG. 8 and the position of FIG. 9.

Generally speaking it is advantageous that the slot 32 shows a slope that is not constant along its length, in order to provide a rapid move of the indicator sleeve, for example at the beginning or at the end of the angular stroke of the device controlling the flow of a fluid. In the above described embodiment, the rapid move is achieved by the S-shaped second portion of the slot that is located at the beginning of the opening stroke. It is however understood that it could be located at the end of the opening stroke, e.g. for applications where it is necessary that the tap is fully opened. It is therefore advantageous that one of the first and third portions extends over a larger angular sector than the other of said first and third portions.

Still generally speaking, the second portion can extend over an angular sector comprised between 50° and 70°, preferably between 55° and 65°. The first portion can extend over an angular sector comprised between 20° and 60°, preferably between 30° and 50°, and the third portion can extend over an angular sector of more than 200°, or vice versa. The slot can also extend over more than one turn, i.e. more than 360°. For example, with reference to FIG. 9, the lower end of the slot, i.e. the third portion, can extend angularly over the higher end, i.e. the first portion $32^1$, thereby providing an overlap between these ends. When the lower end of the slot reaches the second portion $32^2$, it is then necessary that the slot shows a pitch that is greater than the width of the slot. For example, the above described embodiment, the third portion can show a slight slope that corresponds to such a pitch.

Still generally speaking, the indicator of the present invention can be applied to various devices that control the flow of a fluid, like taps for gas cylinders and also pressure reducers. Pressure reducers usually comprise two springs acting on a movable element, usually a piston, controlling the movement of a closure member and delimiting a regulating chamber downstream of said closure member. These two springs usually act on the movable element in opposite directions. A first one of the springs usually tends to close the passage whereas the second one counteracts this effect and allows the fluid to flow. The pre-stress of one these first and second springs can usually be released by means of a rotating wheel or knob. The status of such a wheel or knob can be indicated by the indicator of the invention.

The invention claimed is:

1. Indicator of the opening and/or closing status of a device controlling the flow of a fluid, comprising:
    a sleeve-shaped support to rotatably engage with a protruding portion of a body of the device and from which an actuating spindle extends along a longitudinal axis of said device;
    an indicator sleeve axially sliding along the sleeve-shaped support;
    an assembly for converting a rotation of the spindle into a translation of the indicator sleeve, the assembly comprising:
        a rotor to be fixed to the spindle and comprising at a periphery thereof at least one track with a curved profile; and
        at least one track follower extending radially from the indicator sleeve through a longitudinal slot in the sleeve-shaped support and engaging with the at least one track.

2. Indicator according to claim 1, wherein the curved profile of the at least one track comprises, successively along said track, a straight first portion, an S-shaped second portion and a generally straight third portion.

3. Indicator according to claim 2, wherein the second portion extends over an angular sector comprised between 50° and 70°.

4. Indicator according to claim 2, wherein the second portion extends over an angular sector comprised between 55° and 65°.

5. Indicator according to claim 2, wherein the first portion extends over an angular sector comprised between 20° and 60°, and the third portion extends over an angular sector of more than 200°, or vice versa.

6. Indicator according to claim 2, wherein the first portion extends over an angular sector comprised between 30° and 50°, and the third portion extends over an angular sector of more than 200°, or vice versa.

7. Indicator according to claim 2, wherein the profile of at least one of the first and third portions extends essentially in a plane that is perpendicular to the longitudinal axis.

8. Indicator according to claim 2, wherein the first and third portions are distant along the longitudinal axis by at least 10 mm.

9. Indicator according to claim 1, wherein the at least one track is a slot and the at least one track follower is a pin, said pin being rigidly attached to the indicator sleeve.

10. Indicator according to claim 1, wherein the rotor comprises along the longitudinal axis a cavity with a section that is not circular so as to rotatably engage with a corresponding section of the spindle, said sections being square-shaped.

11. Indicator according to claim 10, wherein the non-circular section of the rotor is formed by a washer rotatably engaging with a cavity of the rotor such that the washer can be positioned at different angular positions.

12. Indicator according to claim 11, wherein the washer has an outer contour with edges along said contour and the cavity of the rotor has corresponding recesses in a number that is greater than the number of edges so as to allow the different angular positions.

13. Indicator according to claim 1, wherein the sleeve-shaped support comprises an inner surface with fluting for rotatably engaging with contour edges of the protruding portion of the body of the device at different angular positions.

14. Indicator according to claim 13, wherein the fluting is formed at one end of the sleeve-shaped support, said end being longitudinally slotted so as to form legs able to flex and pass over the edges of the contour of the protruding portion when a torque over a predetermined level is applied to the rotor.

15. Indicator according to claim 1, wherein the sleeve-shaped support comprises an annular recess in which the indicator sleeve can be hidden in a position of the rotor.

16. Indicator according to claim 1, wherein the indicator sleeve comprises an outer circular surface with coloured and/or indicia marking.

17. Device controlling the flow of a fluid, comprising:
    a body with a fluid inlet, a fluid outlet and a passage fluidly connecting said inlet with said outlet;
    a closure member cooperating with a seat in the passage for controlling the flow of fluid;
    a spindle rotatably mounted on a protruding portion of the body and configured for influencing the position the closure member;
    an actuating wheel mounted on the spindle; and
    an indicator of the opening and/or closing status of the device (2), the indicator comprising:
        a sleeve-shaped support rotatably engaging with the protruding portion of the body;
        an indicator sleeve axially sliding along the sleeve-shaped support;
        an assembly for converting a rotation of the spindle into a translation of the indicator sleeve, the assembly comprising:
            a rotor fixed to the spindle and comprising at a periphery thereof at least one track with a curved profile; and at least one track follower extending radially from the indicator sleeve through a longitudinal slot in the sleeve-shaped support and engaging with the at least one track.

18. Device according to claim 17, wherein the protruding portion of the body comprises an edged contour that mates with the sleeve-shaped support of the indicator, said edged contour being formed by a gland ring around the spindle.

19. Device according to claim 17, wherein the spindle and the wheel can rotate from a closed position of the device to a fully opened position of said device over an angular stroke, the curved profile of the at least one track comprises, successively along said track, a straight first portion, an S-shaped second portion and a generally straight third portion, and the S-shaped second portion of the curved profile of the track is located on an a third of the angular stroke starting from the closed position or the fully opened position.

* * * * *